(12) United States Patent
Ray, III et al.

(10) Patent No.: US 8,719,534 B1
(45) Date of Patent: May 6, 2014

(54) METHOD AND SYSTEM FOR GENERATING A MIGRATION PLAN

(75) Inventors: Fountain L. Ray, III, Apopka, FL (US); Sateesh Basavaraju, Tumkur (IN); Pradeep Palukuri, Hyderabad (IN)

(73) Assignee: Netapp, Inc., Sunnyvale, CA (US)

( * ) Notice: Subject to any disclaimer, the term of this patent is extended or adjusted under 35 U.S.C. 154(b) by 147 days.

(21) Appl. No.: 13/426,477

(22) Filed: Mar. 21, 2012

(51) Int. Cl.
*G06F 12/02* (2006.01)
*G06F 3/06* (2006.01)

(52) U.S. Cl.
CPC ............ *G06F 3/067* (2013.01); *G06F 3/0647* (2013.01); *G06F 2212/154* (2013.01)
USPC .................... 711/165; 711/154; 711/E12.093

(58) Field of Classification Search
CPC ......... G06F 3/067; G06F 3/647; G06F 12/02; G06F 13/12; G06F 2212/154
USPC ................... 711/154, 165, E12.002, E12.093
See application file for complete search history.

(56) References Cited

U.S. PATENT DOCUMENTS

| | | | |
|---|---|---|---|
| 2007/0130234 A1* | 6/2007 | Ikegaya et al. | 707/204 |
| 2009/0150639 A1* | 6/2009 | Ohata | 711/172 |
| 2010/0235592 A1* | 9/2010 | Kaneda et al. | 711/161 |
| 2010/0293412 A1* | 11/2010 | Sakaguchi et al. | 714/17 |
| 2010/0293552 A1* | 11/2010 | Allen et al. | 718/105 |
| 2012/0059797 A1* | 3/2012 | Prahlad et al. | 707/652 |
| 2012/0254554 A1* | 10/2012 | Nakajima | 711/154 |

* cited by examiner

*Primary Examiner* — Hal Schnee
(74) *Attorney, Agent, or Firm* — Klein, O'Neill & Singh, LLP

(57) ABSTRACT

Method and system for generating a migration plan for migrating information from a source storage location to a destination storage location, where storage space at the source storage location is presented as a plurality of storage volumes to a plurality of computing systems is provided. A parsed data structure is generated for a processor executable planning module used for generating the migration plan. The parsed data structure stores information regarding a plurality of computing systems that access the storage volumes for storing information at a storage device managed by a storage controller; information regarding a plurality of adapters used by the plurality of computing systems and the storage controller; and information regarding logical unit numbers (LUNs) that are presented for storing the information at the storage device.

20 Claims, 6 Drawing Sheets

METHOD AND SYSTEM FOR GENERATING A MIGRATION PLAN

TECHNICAL FIELD

The present disclosure relates to storage systems.

BACKGROUND

Various forms of storage systems are used today. These forms include direct attached storage (DAS) network attached storage (NAS) systems, storage area networks (SANs), and others. Storage systems are commonly used for a variety of purposes, such as providing multiple users with access to shared data, backing up data and others.

A storage system typically includes at least one computing system executing a storage operating system for storing and retrieving data on behalf of one or more user computing systems. The storage operating system stores and manages shared data containers in a set of mass storage devices.

Information stored at the mass storage devices is often migrated from a first location (may be referred to as a source location) to a second location (may be referred to as a destination location) for backing up data and protecting against a disaster at the first location. Information may also be migrated from an older storage system to a newer storage system or from a storage system managed by a first vendor to a storage system managed by a second vendor. Often migrating information involves various components within an operating environment comprising of a plurality of servers, switches, adapters, migration appliance and storage systems. A user that attempts to migrate information in such an environment often has to manually input information regarding various components and go through various steps to obtain information regarding the different components.

Migration today is becoming complex as operating environments continue to expand increasing the number of storage devices for storing large amounts of information; switches and computing systems that access the storage devices. Continuous efforts are being made for generating a migration plan that can be used as a tool for efficient migration of information from a source location to a destination location.

SUMMARY

In one embodiment, a machine implemented method and system for generating a migration plan for migrating information from a source storage location to a destination storage location is provided. Storage space at a storage device at the source storage location managed by a storage controller is presented as a plurality of storage volumes to a plurality of computing systems. A parsed data structure is provided to a processor executable planning module for generating the migration plan. The parsed data structure stores information regarding the plurality of computing systems that access the storage volumes for storing information at the storage device at the source location; and information regarding a plurality of adapters used by the plurality of computing systems and the storage controller. The parsed data structure also includes information regarding logical unit numbers (LUNs) that are presented for storing the information at the storage device.

The parsed data structure is used to obtain information regarding a switch that may be used for migrating the information based on the migration plan. The switch information identifies the switch and a plurality of switch ports. A migration appliance is added to the migration plan by obtaining information regarding the migration appliance from the parsed data structure. A destination LUN used for storing information at the destination location after migration is also added to the migration plan. The zoning information regarding the migration appliance is also obtained from the parsed data structure and is used to prevent unauthorized access to the information after it is migrated using the migration plan.

In another embodiment, a machine implemented method for generating a migration plan for migrating information from a source storage location to a destination storage location, where storage space at a storage device at the source storage location managed by a storage controller, is presented as a plurality of storage volumes to a plurality of computing systems is provided. The method includes generating a parsed data structure for a processor executable planning module for generating the migration plan; and obtaining from the parsed data structure information regarding a switch used for migrating the information based on the migration plan.

The method further includes adding a migration appliance to the migration plan by obtaining information regarding the migration appliance from the parsed data structure; inserting a destination LUN in the migration plan, where the destination LUN is used for storing information at the destination location; and obtaining zoning information regarding the migration appliance from the parsed data structure and using the zoning information in the migration plan for preventing unauthorized access to the information after it is migrated using the migration plan.

In yet another embodiment, a machine implemented method for generating a migration plan for migrating information from a source storage location to a destination storage location is provided. The method includes executing a processor executable migration module having a processor executable parsing module and a processor executable planning module at a management console for generating the migration plan. The parsing module generates a parsed data structure for storing information regarding a plurality of computing systems that access a plurality of storage volumes at the source location for storing information at a storage device; information regarding a plurality of adapters used by the plurality of computing systems for communicating with the storage device; and information regarding logical unit numbers (LUNs) that are presented to the plurality of computing systems for storing the information at the storage device.

The method further includes using the planning module to add a switch having a plurality of switch ports to the migration plan, where each switch port is identified by a unique identifier; adding a migration appliance to the migration plan by obtaining information regarding the migration appliance from the parsed data structure. The zoning information regarding the migration appliance is used by the migration plan to prevent unauthorized access to the information after it is migrated. The method further includes using the planning module for inserting a destination LUN in the migration plan, where the destination LUN is used to store the information after migration.

In another embodiment, a system for generating a migration plan for migrating information from a source storage location to a destination storage location is provided. The system includes a storage device at the source storage location used by a plurality of computing systems for storing the information; and a management console executing a processor executable migration module having a processor executable parsing module and a processor executable planning module for generating the migration plan.

The parsing module is configured to generate a parsed data structure for storing information regarding the plurality of computing systems; information regarding a plurality of adapters used by the plurality of computing systems for communicating with the storage device; and information regarding logical unit numbers (LUNs) that are presented to the plurality of computing systems for storing the information at the storage device.

The planning module is configured to add a switch to the migration plan, where the switch includes a plurality of switch ports each identified by a unique identifier; add a migration appliance to the migration plan by obtaining information regarding the migration appliance from the parsed data structure, where the information regarding the migration appliance includes a unique identifier identifying the migration appliance and unique identifier information identifying migration appliance ports; and insert a destination LUN in the migration plan, where the destination LUN is used to store the information after migration.

This brief summary has been provided so that the nature of this disclosure may be understood quickly. A more complete understanding of the disclosure can be obtained by reference to the following detailed description of the various embodiments thereof in connection with the attached drawings.

BRIEF DESCRIPTION OF THE DRAWINGS

The foregoing features and other features will now be described with reference to the drawings of the various embodiments. In the drawings, the same components have the same reference numerals. The illustrated embodiments are intended to illustrate, but not to limit the present disclosure. The drawings include the following Figures.

DETAILED DESCRIPTION

Figure 1A:
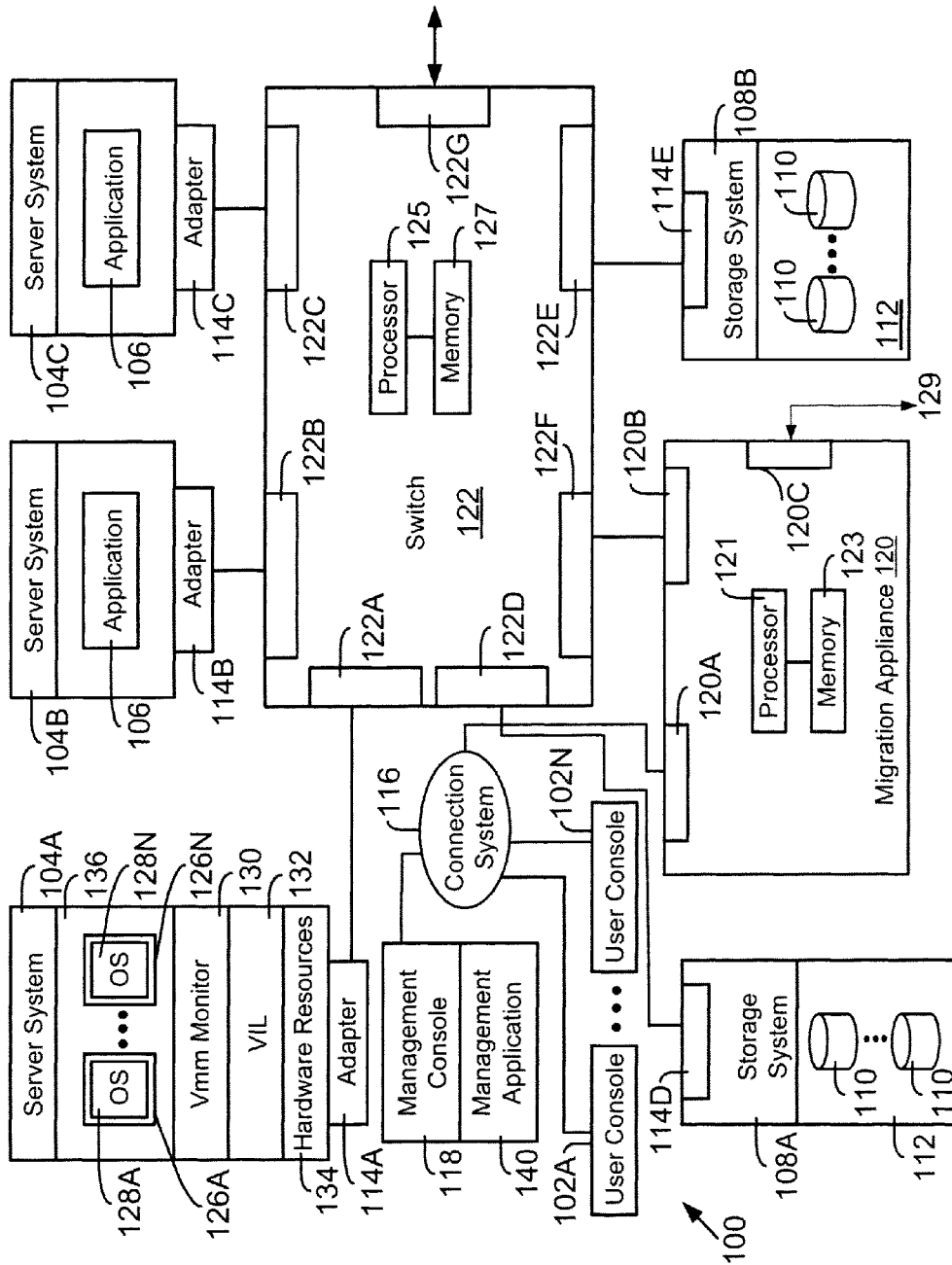
FIG. 1A shows an example of an operating environment for the embodiments disclosed herein.

As preliminary note, the terms "component", "module", "system," and the like as used herein are intended to refer to a computer-related entity, either software-executing general purpose processor, hardware, firmware and a combination thereof. For example, a component may be, but is not limited to being, a process running on a processor, a processor, an object, an executable, a thread of execution, a program, and/or a computer.

By way of illustration, both an application running on a server and the server can be a component. One or more components may reside within a process and/or thread of execution, and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

Computer executable components can be stored, for example, on computer readable media including, but not limited to, an ASIC (application specific integrated circuit), CD (compact disc), DVD (digital video disk), ROM (read only memory), floppy disk, hard disk, solid state memory (e.g., flash), EEPROM (electrically erasable programmable read only memory), memory stick or any other storage device type, in accordance with the claimed subject matter.

In one embodiment, a machine implemented method and system for generating a migration plan for migrating information from a source storage location to a destination storage location is provided. Storage space at a storage device at the source storage location managed by a storage controller is presented as a plurality of storage volumes to a plurality of computing systems. A parsed data structure is provided to a processor executable planning module for generating the migration plan. The parsed data structure stores information regarding the plurality of computing systems that access the storage volumes for storing information at the storage device at the source location; and information regarding a plurality of adapters used by the plurality of computing systems and the storage controller. The parsed data structure also includes information regarding logical unit numbers (LUNs) that are presented for storing the information at the storage device.

The parsed data structure is used to obtain information regarding a switch that may be used for migrating the information based on the migration plan. The switch information identifies the switch and a plurality of switch ports. A migration appliance is added to the migration plan by obtaining information regarding the migration appliance from the parsed data structure. A destination LUN used for storing information at the destination location after migration is also added to the migration plan. The zoning information regarding the migration appliance is also obtained from the parsed data structure and is used to prevent unauthorized access to the information after it is migrated using the migration plan.

System 100:

FIG. 1A shows an example of an operating environment 100 (may also be referred to as system 100), for implementing the adaptive embodiments disclosed herein. System 100 includes a processor executable management application 140 that is used to collect data regarding various system 100 components, parse the collected data such that the parsed data can be easily used to generate a migration plan for migrating information from a source location to a destination location, as described below in detail.

In one embodiment, system 100 may include a plurality of computing systems 104A-104C (may also be referred to as server system 104 or host system 104) that may store information at storage devices 110 within a storage sub-system 112 managed by one or more storage systems 108A-108B (may be individually referred to as storage system 108). The storage devices 110 may include writable storage device media such as magnetic disks, video tape, optical, DVD, magnetic tape, non-volatile memory devices for example, flash memory devices and any other similar media adapted to store information. The storage devices 110 may be organized as one or more groups of Redundant Array of Independent (or Inexpensive) Disks (RAID). The embodiments disclosed herein are not limited to any particular storage device or storage device configuration. It is noteworthy that the term "disk" as used herein is intended to mean any storage device/ space and is not to limit the adaptive embodiments to any particular type of storage device, for example, hard disks or others.

As an example, storage system 108A may be the source location and storage system 108B may be the destination location for migrating information based on a migration plan generated according to the embodiments described herein.

The server systems 104A-104C may communicate with each other for working collectively to provide data-access service to user consoles (user computing systems/devices) 102A-102N via a connection system 116 such as a local area network (LAN), wide area network (WAN), the Internet or any other network type.

Server systems 104A-104C may be general-purpose computers configured to execute applications 106 over a variety of operating systems, including the UNIX® and Microsoft Windows® operating systems. Application 106 may utilize data services of storage system 108 to access, store, and manage data at storage devices 110. Application 106 may include an email exchange application, a database application or any other type of application.

Server systems 104 may use block-based access protocols, for example, the Small Computer Systems Interface (SCSI) protocol encapsulated over TCP (iSCSI) and SCSI encapsulated over Fibre Channel (FCP) to access storage device 110 via a storage area network (SAN) or file-based access protocols for example, the Common Internet File System (CIFS) or the Network File System (NFS) protocol over a network attached storage (NAS)-based network.

In one embodiment, to facilitate access to storage devices 110, a storage operating system of storage system 108 "virtualizes" the storage space provided by storage devices 110. The storage system 108 can present or export data stored at storage devices 110 to server systems 104 as a storage object such as a volume. Each storage volume may be configured to store data files (or data containers or data objects), scripts, word processing documents, executable programs, and any other type of structured or unstructured data. From the perspective of the server systems, each volume can appear to be a single storage device, storage container, or storage location. However, each volume can represent the storage space in one storage device, an aggregate of some or all of the storage space in multiple storage devices, a RAID group, or any other suitable set of storage space.

In one embodiment, a storage device (or portion thereof) is presented as a "logical unit number" (LUN) to the server systems 104A-104C by storage system 108 or any other device. A LUN may refer to a logical data container that appears to be a storage device to a host system but may be distributed across multiple storage devices by storage system 108. A LUN is typically identified by a unique identifier (LUN identifier). Each LUN has a capacity which indicates the storage capacity that may be available to a host system, and a block size that is used by a file system of the storage system 108 to store information on behalf of the host systems 104A-104C. Before a LUN is made available for use, it is typically configured by a user/storage administrator using the management application 140 executed at a management console 118 that is described below in detail.

The storage system 108 may be used to store and manage information at storage devices 110 based on a request generated by server system 104, the management console 118 or any user console 102. As an example, in a typical mode of operation, server system 104 transmits one or more read or write requests, to the storage system 108. Storage system 108 receives the request, issues one or more I/O commands to storage devices 110 to read or write the data on behalf of the server system 104, and issues a response with the requested data to the respective server system 104.

In one embodiment, storage system 108 may have a distributed architecture, for example, a cluster based system that may include a separate N-("network") blade or module and D-(data) blade or module. Briefly, the N-blade is used to communicate with host platform server system 104 and management console 118, while the D-blade is used to communicate with the storage devices 110 that are a part of a storage sub-system or other D-blades. The N-blade and D-blade may communicate with each other using an internal protocol.

One or more of server systems, for example, 104A may also execute a virtual machine environment 136, according to one embodiment. In the virtual machine environment 136 a physical resource is shared among a plurality of independently operating processor executable virtual machines (VMs) 126A-126N. Each VM may function as a self-contained platform or processing environment, running its own operating system (OS) (128A-128N) and computer executable, application software. The computer executable instructions running in a VM may be collectively referred to herein as "guest software". In addition, resources available within the VM may be referred to herein as "guest resources".

The guest software expects to operate as if it were running on a dedicated computer rather than in a VM. That is, the guest software expects to control various events or operations and have access to hardware resources 134 on a physical computing system (may also be referred to as a host platform) which maybe referred to herein as "host hardware resources". The hardware resources 134 may include one or more processors, resources resident on the processors (e.g., control registers, caches and others), memory (instructions residing in memory, e.g., descriptor tables), and other resources (e.g., input/output devices, host attached storage, network attached storage or other like storage) that reside in a physical machine or are coupled to the host platform.

VMs 126A-126N may store information at storage devices 110. The information may be migrated using a migration plan generated according to the embodiments described below in detail.

A virtual machine monitor (VMM) 130, for example, a processor executed hypervisor layer provided by VMWARE, Inc., HYPER-V layer provided by MICROSOFT CORPORATION (without derogation of any trademark rights) or any other layer type, presents and manages the plurality of guest OS 128A-128N. The VMM 130 may include or interface with a virtualization layer (VIL) 132 that provides one or more virtualized hardware resource 134 to each guest OS. For example, VIL 132 presents physical storage at storage devices 110 as virtual storage for example, as a virtual storage device or virtual hard drive (VHD) file to VMs 126A-126N. The VMs then store information in the VHDs which are in turn stored at storage devices 110.

In one embodiment, VMM 130 is executed by server system 104 with VMs 126A-126n. In another embodiment, VMM 130 may be executed by an independent stand-alone computing system, often referred to as a hypervisor server or VMM server and VMs 126A-126N are presented via another computing system. It is noteworthy that various vendors provide virtualization environments, for example, VMWARE Inc., MICROSOFT CORPORATION and others. The generic virtualization environment described above with respect to FIG. 1A may be customized depending on the virtual environment provider.

Server systems 104A-104C may use (e.g., network and/or or storage) adapters 114A-114C to access and communicate with storage systems 108A-108B. In one embodiment, the storage systems 108A-108B may be accessed via a fabric switch 122 (may also be referred to as switch 122) that includes a processor 125 having access to a memory device 127 and a plurality of ports 122A-122G. The processor 125 executes firmware instructions out of memory device 127 for controlling overall switch operations.

Ports 122A-122G may be used for receiving and sending frames. Each port includes logic and circuitry for processing received information and transmitting information. The port structure depends on the protocol that is used for communication. For example, if switch 122 is a Fibre Channel (or Fibre Channel over Ethernet (FCoE) switch then ports 122A-122G are configured to process Fibre Channel and FCoE frames, respectively.

As an example, port 122A of switch 122 may be coupled to adapter 114A, port 122B may be coupled to adapter 114B, while port 122C may be coupled to adapter 114C. Port 122D may be coupled to adapter 114D, while port 122E may be coupled to adapter 114E. This allows the various server systems to send read and write requests for reading or writing information at a storage device managed by the storage systems 108A/108B. Port 122G may be coupled to other fabric switches/devices or to connection system 116 for communicating with management console 118. Port 122F may be coupled to port 120B of a migration appliance (may also be referred to as appliance 120) 120 that is described below in detail.

In one embodiment, migration appliance 120 may be used for migrating information from the source location (for example, 108A) to the destination location (for example, 108B) using the migration plan generated according to the adaptive embodiments of the present disclosure. Appliance 120 may include a processor 121 having access to a memory device 123. Processor 121 executes firmware instructions out of memory device 123 for controlling overall appliance 120 operations.

Migration appliance 120 may also include a plurality of ports, for example, ports 120A-120C for sending and receiving information for migrating information. As an example, Port 120A may be coupled to connection system 116 which allows management console 118 to communicate with appliance 120 via connection system 116.

Port 120B of appliance 120 may be coupled with port 122F of switch 122. This enables appliance 120 to communicate with storage systems 108A and 108B to migrate information based on the migration plan generated, according to one embodiment. Port 120C of appliance 120 may be coupled to other devices or another migration appliance (not shown) via a link 129.

In one embodiment, the management console 118 executes the processor-executable management application 140 that may be used for managing and configuring various elements of system 100 as well as for generating the migration plan for migrating a storage volume from the source location to the destination location. Details regarding management application 140 and the process for generating the migration plan are provided below in more detail.

Figure 1B:
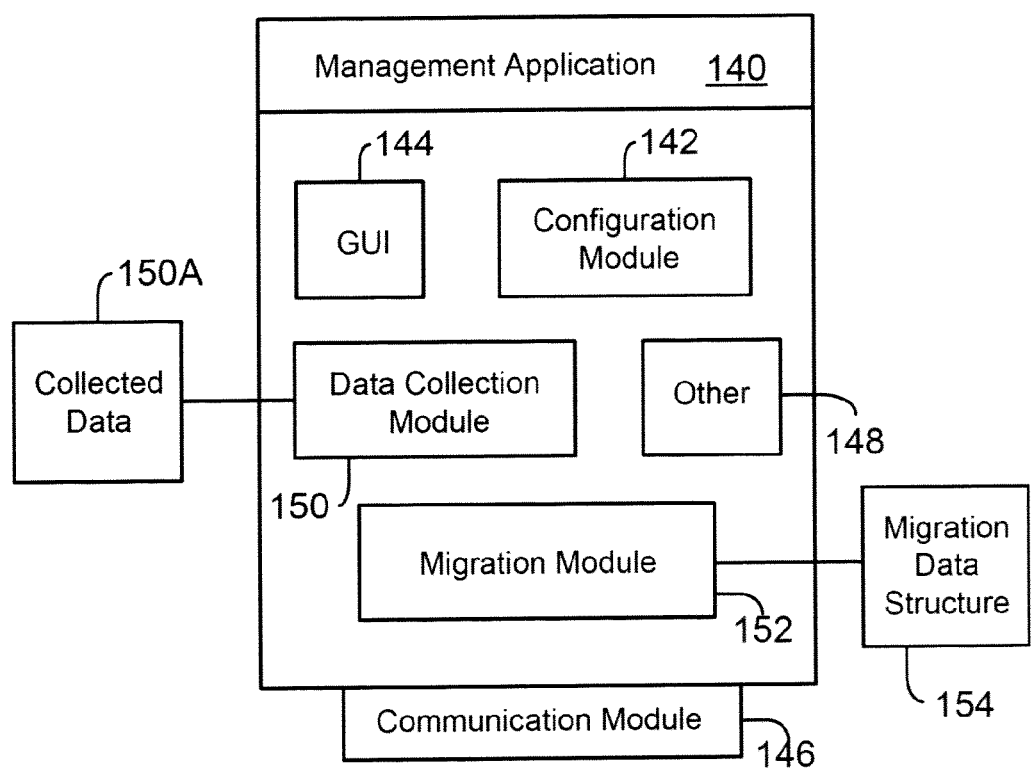
FIG. 1B shows an example of a management application, according to one embodiment.

Management Application 140:

FIG. 1B shows a block diagram of management application 140 having a plurality of modules, according to one embodiment. The various modules may be implemented in one computing system or in a distributed environment among multiple computing systems.

In one embodiment, management application 140 includes a data collection module 150 and a migration module 152. The data collection module 150 collects information regarding various system 100 components. Data collection module 150 may issue a series of commands for various system 100 components' to collect such information. The commands are transmitted via the connection system 116 or otherwise to system 100 components. The components' respond with the requested information. The received raw data is then stored as a data structure, shown as collected data 150A. The collected data 150A may be stored at a storage device that is accessible to management console 118 either locally or remotely via connection system 116.

In one embodiment, data collection module 150 issues a set of commands to obtain information regarding various adapters 114A-114E that are configured to respond to such commands. The adapters' 114A-114E respond with the requested information, which may include identifier information for each adapter port (for example, a worldwide port number (WWPN)), a firmware revision of the firmware for each adapter or any other adapter information.

In one embodiment, data collection module 150 may also issue a set of commands to obtain information regarding appliance 120. Processor 121 of appliance 120 then responds with the requested information, which may include unique identifier information for each appliance 120 port (for example, WWPN), zoning information for appliance 120 ports, connection information for appliance 120 ports or any other information.

In one embodiment, data collection module 150 may also issue a set of commands to obtain information regarding switch 122. Processor 125 of switch 122 responds with the requested information, for example, identifier information for each switch port, zoning information for each port, connection information or any other information.

Data collection module 150 also obtains information from storage systems 108A-108B. This information includes LUN information, for example, LUN size, LUN identifiers, or any other information type. The LUN information may be stored as data structures (not shown) by the storage systems 108A-108B that manage the storage devices 110 and the LUNs presented to server systems 104.

In one embodiment, the migration module 152 is used for generating a migration plan based on parsed data that is collected by the data collection module 150. The parsed data may be a part of a migration data structure 154 or an independent data structure (not shown). The details of migration module 152 and the process for generating the migration plan are described below in detail.

In the illustrated embodiment, the management application 140 may further include a graphical user interface (GUI) module 144 to generate a GUI for use by a storage administrator or a user using a user console 102. In another embodiment, management application 140 may present a command line interface (CLI) to a user for inputting processor executable instructions. The GUI may be used by a user to configure the various components of system 100 and provide input parameters for generating a migration plan, as described below in detail.

Management application 140 may also include a communication module 146 that implements one or more conventional communication protocols and/or APIs to enable the various modules of management application 140 to communicate with the storage system 108, appliance 120, switch 122, server systems 104A-104C and user console 102.

Management application 140 may also include other modules 148. The other modules 148 are not described in detail because the details are not germane to the inventive embodiments.

Figure 1C:
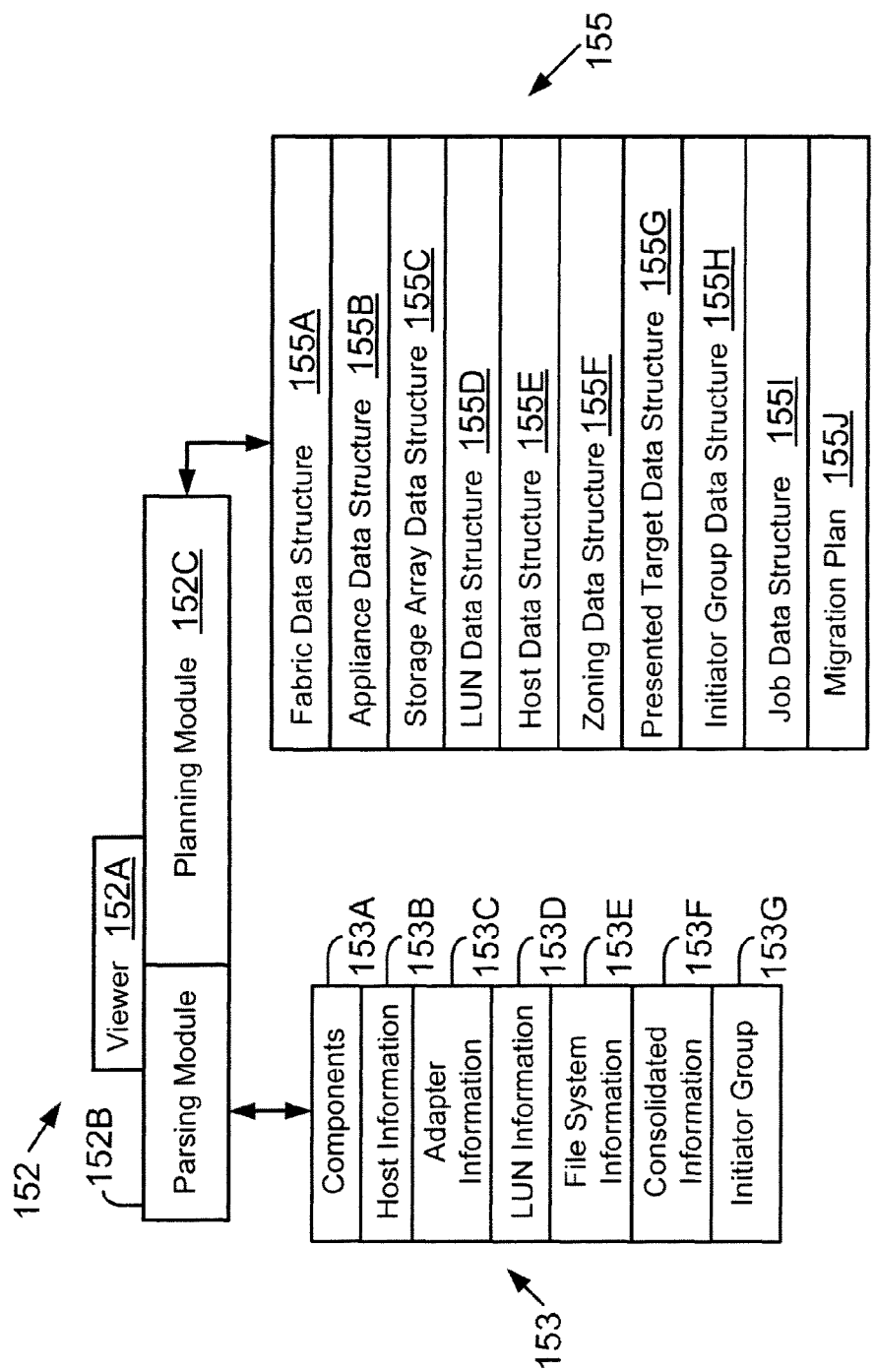
FIG. 1C shows an example of a migration module of the management application of FIG. 1B, according to one embodiment.

FIG. 1C shows a block diagram of migration module 152, according to one embodiment. Migration module 152 includes a viewer module 152A that displays information collected by data collection module 150 and parsed by a parsing module 152B. The parsed data may be stored as a plurality of data structures, jointly shown as 153. The various data structures may be stored independently or included as part of the migration data structure 154. The various data structures 153 may be accessed via user selectable tabs provided within a GUI or retrieved by CLI commands.

In one embodiment, the data structure 153 includes a plurality of sub-data structures 153A-153G. Data structure 153 is populated by parsing the collected data 150A, described above.

Data structure 153 includes a listing of various components 153A of system 100. The list of components' 153A may be used to identify adapters' 114A-114E, migration appliance 120, fabric switch 122 and management console 118. A user is able to view the components' using the viewer module 152A.

Data structure 153 may also be used to store host system information 153B, according to one embodiment. The host system information 153B may be used to identify host systems 104A-104C, the host system type, a cluster name, if the host system is part of a computing cluster, details regarding the processors used by host systems 104A-104C, information regarding VMs 126A-126N and any other information type.

Data structure 153 also stores information regarding the various adapters 114A-114E as adapter information 153C. The adapter information 153C may be include the WWPN for uniquely identifying each adapter, details regarding adapter firmware, for example, firmware revision number, and any other identification information, for example, a Fibre Channel identifier (FCID) that is issued to each adapter by fabric switch 122 during an initialization process when the adapters communicate with the fabric switch 122. Details of generating the FCID are described by the standard Fibre Channel specifications and are not germane to the inventive embodiments described herein.

Data structure 153 also stores LUN information 153D, according to one embodiment. The LUN information 153D is used to identify a LUN that will be migrated from the source location to the destination, a LUN size, the partitions that may be used within the LUN, an offset value from where the partitions start and a block size (for example, 4 k) used for storing information for the LUN.

In one embodiment, information regarding the LUNs is obtained by data collection module 150 using a plurality of commands. The raw LUN data is part of the collected data 150A but is spread out as output of various commands. The LUN data is parsed by parsing 152B and stored as LUN information 153D such that a user can easily view the information and also use it for creating a migration plan.

File system information 153E is used to store information regarding the file systems that are used by storage systems 108A-108B. This information includes the drive letters that may be used by the file systems, the type of partitions used by the file systems (for example, NTFS or SAN), total capacity available to the file system, the block size used to store information, available storage space for the file system and any other information.

The LUN, file system and partition information may also be stored as consolidated information 153F such that it can be viewed within a same GUI window (not shown). Consolidated information 153F includes an identifier for identifying a host system, LUN identification information identifying a LUN that will be migrated using the migration plan, partition size and partition offset information, a drive identifier for the LUN, file system capacity, block size, and a drive letter used for mounting the file system. The consolidated data structure 153F provides information regarding various components' for generating a migration plan, as described below.

Data structure 153 may also store initiator group (igroup) information 153G. The igroup information 153G is used by the migration appliance 120 to migrate a host system to a destination. The igroup information 153G includes a set of WWPNs for the host system adapters 114A-114C, as well as information regarding the operating system type used by the server systems 104A-104C. The details of how igroup information is used by the migration appliance 120 are not germane to the embodiments described herein.

The migration module 152 also includes a planner module 152C that is used to generate the migration plan, according to one embodiment. For generating a migration plan, the planner module 152C maintains or has access to various data structures, shown as 155. Data structure 155 may be accessed via one or more user-selectable GUI tabs displayed on a display device.

Data structure 155 stores a migration plan 155J that is generated based on information in the data structures 155A-155J. In one embodiment, a user can check the status of the migration plan while it is being generated by simply selecting a migration plan tab from a GUI.

To migrate a LUN from a source location (for example, storage system 108A) that is accessible to one or more host systems (or VMs), a fabric data structure 155A is populated to store information regarding a fabric switch (for example, 122) that may be used for migrating information. Fabric data structure 155A stores a fabric name for identifying the fabric switch 122, the name of a fabric switch manufacturer (for example, Brocade Corporation), a zone set and a virtual SAN (VSAN) identifier, if virtual SANs are used.

The zone set includes permissions based on which switch ports are allowed to communicate. For example, if application 106 executed at server 104B is permitted to access storage device 110 managed by storage system 118B, then a zone set includes identifying information for adapter 114B, port 122B, port 122E and adapter 114E. The zone set information is used to prevent unauthorized access by an application or any other component.

Data structure 155 also includes an appliance data structure 155B for storing information regarding the migration appliance 120 that may be used for migrating information per the migration plan generated according to one embodiment. Appliance data structure 155B includes a name of the migration appliance 120, an identifier for the migration appliance 120, for example, IP address, number of ports for the appliance and a number of virtual port groups (VPGs), when used by the migration appliance.

Most systems have a maximum number of LUNs that can be accessed via a migration appliance, for example, 256 LUNs. In such a situation, multiple VPGs are used such that the migration appliance 120 appears as multiple hosts for executing a migration operation.

Data structure 155 also includes a storage array data structure 155C, according to one embodiment. The storage array data structure 155C includes a name and type of a storage array. Data structure 155C also includes information regarding the storage system 108A (may also be referred to as controller), which includes a WWPN of an adapter (for example, 114D) used by the storage controller, port information of the fabric switch (for example, port 122F of fabric switch 122) to which the controller port (i.e. the adapter) is coupled. It is noteworthy that the storage array data structure 155C is maintained for both the source and the destination location.

In one embodiment, data structure 155 also includes a LUN data structure 155D that is used to store information for a destination LUN. The information includes identifier information for identifying the destination LUN, information regarding an adapter that is used to access the destination LUN and information regarding a host system that will access the destination LUN. In one embodiment, the information for LUN data structure 155D may be obtained from parsed data structure 153.

In one embodiment, data structure 155 also includes a host data structure 155E that includes information to map host systems (or VMs) to VPGs. The storage devices used for migrating a storage volume are also mapped to the VPGs and stored in host data structure 155E.

Data structure 155 includes a zoning data structure 155F, according to one embodiment. Zoning data structure 155F stores the names of a fabric switch, the name of a zone and the members of the zone. The zoning data structure 155F is used to ensure data integrity and stability during a migration operation by preventing unauthorized access.

Data structure 155 also includes a presented target 155G, according to one embodiment. Appliance 120 can present different source storage to a same host system as presented targets. Details regarding presenting storage as "presented targets" are not germane to adaptive embodiments of the present disclosure.

The presented target data structure 155G may be used to store a presented target name, an identifier for the presented target (for example, a WWPN), a source WWPN that accesses the presented target, information regarding a source storage array portion of which is included in the presented target, and information regarding a fabric switch for accessing the storage array.

Data structure 155 also includes a jobs data structure 155I that is used to store details regarding a migration operation. A user using a computing system can add a migration job via a GUI tab or otherwise. The job data structure 155I stores identification information of migration appliance 120, an IP address used by migration appliance 120, and information for identifying a source volume that is migrated.

Data structure 155 may also include an initiator group data structure 155H, according to one embodiment that includes information similar to the igroup information 153G described above.

Migration plan data structure 155J is developed while other data structures, i.e. 155A-155I are being developed. A user is able to view a migration plan while it is being developed at any instance by selecting a GUI tab or otherwise.

Figure 1D:
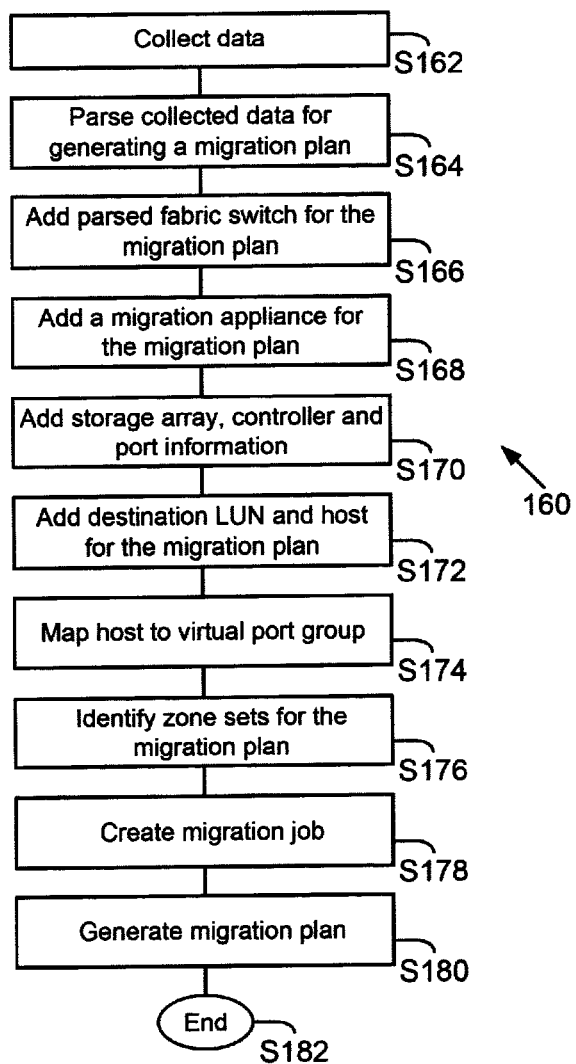
FIG. 1D shows a process flow diagram for generating a migration plan according to one embodiment.

Process Flow:

FIG. 1D shows a process 160 for generating a migration plan, according to one embodiment. The migration plan is generated by parsing collected data 150A and maintaining the parsed data structure 153. The migration plan is used to migrate information from a source location (for example, storage device 110 managed by storage system 108A) to a second location (or destination location, for example, storage devices 110 managed by storage system 108B).

The process starts in block S162 when data collection module 150 collects information regarding various system 100 components and stores the information as collected data 150A at a memory storage device that is accessible to management application 140.

As described above, data collection module 150 may issue a plurality of commands to collect information regarding host systems 104A-104C, adapters' 114A-114E, migration appliance 120, fabric switch 122, storage systems 108A-108B, storage devices 110, VMs 126A-126N and others. Data collection module 150 is configured to send the commands to various components in one or more formats depending on the protocol/standard that is used for communication. For example, to obtain fabric switch 122 information operating as a Fibre Channel switch, data collection module 150 may send a Fibre Channel command to retrieve connection and identification information of ports 122A-122G. The adaptive embodiments are not limited to any particular format for communicating with system 100 components.

In block S164, the collected data 150A is parsed by parsing module 152B. The parsed data may be stored as data structure 153 having data structures 153A-153G described above with respect to FIG. 1C. The parsed data structure 153 may be accessible to a user via GUI tabs that are presented by the GUI module 144 or otherwise.

In block S166, a fabric switch (for example, 122) that may be used for migrating information from the source location to the destination is added for the migration plan. The fabric switch information for the migration plan may be obtained from fabric data structure 155A that has been described above with respect to FIG. 1C.

When there are multiple switches that may allow migration from the source location to the destination location, then management application 140 selects an optimum path having one or more switch for the migration plan. Different factors, for example, network congestion, link rates, shortest paths or any other algorithm may be used for selecting the switches. Details regarding path/switch selection are not germane to the embodiments disclosed herein.

In block S168, information regarding a migration appliance (for example, 120) is added for the migration plan. The migration appliance is used to interface between server systems 104A-104C and the storage devices as shown in FIG. 1A and described above. In one embodiment, information regarding the migration appliance 120 may be obtained from appliance data structure 155B. A user may also enter migration appliance 120 details via a GUI displayed on a display device.

In block S170, storage array information for both the source and destination location for the migration plan is obtained. In one embodiment, the storage array information is obtained from storage array data structure 155C that has been described above in detail. The storage array information may also be entered by a user via a GUI. The storage array information includes information regarding the storage controller that manages the storage array.

In block S172, information regarding the destination LUN is obtained for the migration plan. The destination LUN is at the destination location where information for a source LUN will be migrated per the migration plan. The destination LUN information may be based on LUN data structure 155D that has been described above in detail.

In one embodiment, the planner module 152C enables creating the destination LUN whose block sizes are aligned to the block size used by a storage operating system. The partition offset information that is collected and saved in LUN data structure 155D is used to create and align the destination LUN.

In block S174, the host system is mapped to a VPG. A plurality of host systems may be mapped to the VPG. This allows appliance 120 to appear as multiple host systems. The host to VPG mapping has been described above with respect to FIG. 1C.

In block S176, zone sets for the migration plan are generated. The zone sets are used so that after a source location is migrated, it can be accessed with the same permissions prior to the migration. The zone set information may be obtained from zoning data structure 155F, described above with respect to FIG. 1C.

In block S178, a migration job is created. The migration job may be input using the job data structure 155I. Thereafter, the migration plan is generated in block S180. The migration plan may be stored as data structure 155J. The migration plan is a detailed step-by-step plan that can be used by a data center administrator to migrate the source location to the destination location. The plan identifies the various components that are used during migration and provides details of such components. This is helpful because as data centers continue to grow using expansive and complex networks, a well documented migration plan allows a user to efficiently migrate information. Details of actual migration are not germane to the adaptive embodiments described herein.

Figure 2:
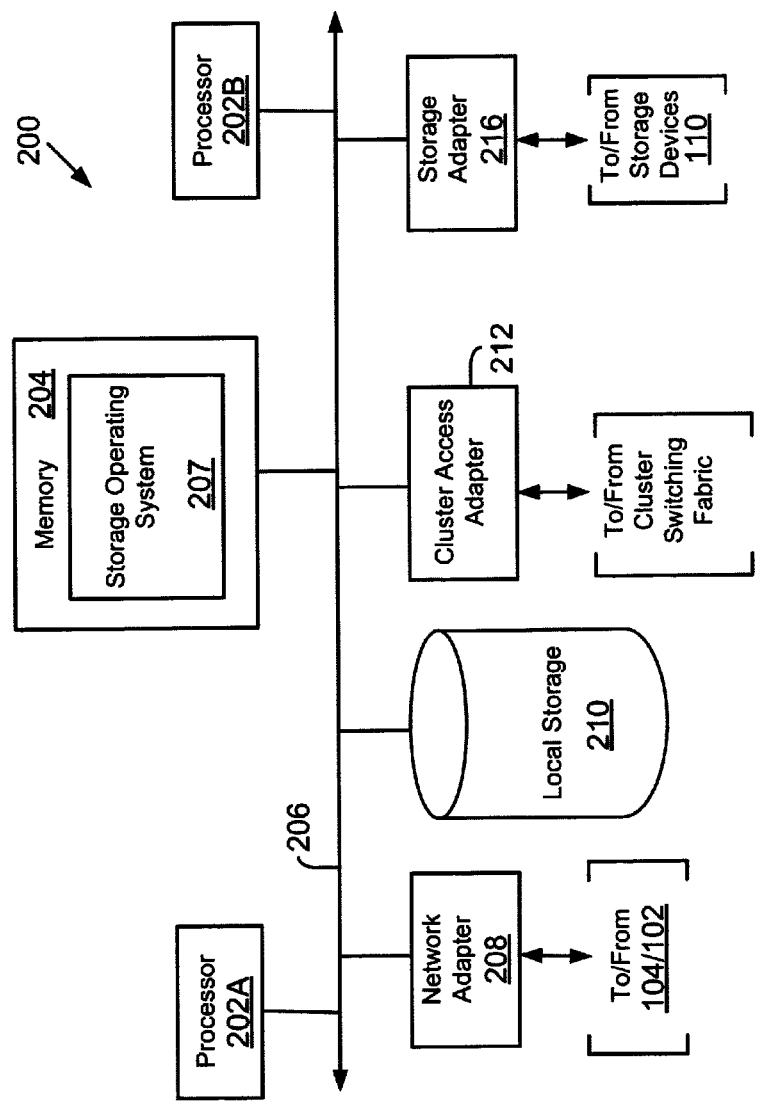
FIG. 2 shows an example of a storage system, used according to one embodiment.

Storage System:

FIG. 2 is a block diagram of a computing system 200 (also referred to as system 200), according to one embodiment. System 200 may be used as a stand-alone storage system 108A-108B and/or a storage system node operating within a cluster based storage system (not shown). System 200 is accessible to server systems 104A-104C, user console 102 and/or management console 118 as shown in FIG. 1A and described above. System 200 may provide details regarding adapters 114D-114E, LUN information at the source and destination, zoning information, file system information and any other information that may be used for populating various details of the parsed data structure 153A and data structures 155A-155J described above in detail.

System 200 may include a plurality of processors 202A and 202B, a memory 204, a network adapter 208, a cluster access adapter 212 (used for a cluster environment), a storage adapter 216 and local storage 210 interconnected by a system bus 206. The local storage 210 comprises one or more storage devices, utilized by the processors to locally store configuration and other information.

The cluster access adapter 212 comprises a plurality of ports adapted to couple system 200 to other nodes of a cluster (not shown). In the illustrative embodiment, Ethernet may be used as the clustering protocol and interconnect media, although it will be apparent to those skilled in the art that other types of protocols and interconnects may be utilized within the cluster architecture described herein.

System 200 is illustratively embodied as a dual processor storage system executing a storage operating system 207 that preferably implements a high-level module, such as a file system, to logically organize information as a hierarchical structure of data containers for example, named directories and files on storage devices 110. However, it will be apparent to those of ordinary skill in the art that the system 200 may alternatively comprise a single or more than two processor systems. Illustratively, one processor 202 may execute the functions of an N-module on a node, while the other processor 202B executes the functions of a D-module.

The memory 204 illustratively comprises storage locations that are addressable by the processors and adapters for storing programmable instructions and data structures. The processor and adapters may, in turn, comprise processing elements and/or logic circuitry configured to execute the programmable instructions and manipulate the data structures. It will be apparent to those skilled in the art that other processing and memory means, including various computer readable media, may be used for storing and executing program instructions pertaining to the invention described herein.

The storage operating system 207 may maintain LUN information, zoning information, file system information and any other information that may be used for parsed data structure 153A and data structures 155A-155J for generating a migration plan. The storage operating system 207, portions of which is typically resident in memory and executed by the processing elements, functionally organizes the system 200 by, inter alia, invoking storage operations in support of the storage service provided by storage system 108. An example of operating system 207 is the DATA ONTAP® (Registered trademark of NetApp, Inc. operating system available from NetApp, Inc. that implements a Write Anywhere File Layout (WAFL® (Registered trademark of NetApp, Inc.)) file system. However, it is expressly contemplated that any appropriate storage operating system may be enhanced for use in accordance with the inventive principles described herein. As such, where the term "ONTAP" is employed, it should be taken broadly to refer to any storage operating system that is otherwise adaptable to the teachings of this invention.

The network adapter 208 comprises a plurality of ports adapted to couple system 200 to one or more systems (e.g. 104/102) over point-to-point links, wide area networks, virtual private networks implemented over a public network (Internet) or a shared local area network. The network adapter 208 thus may comprise the mechanical, electrical and signaling circuitry needed to connect storage system 108 to the network. Illustratively, the computer network may be embodied as an Ethernet network or a FC network.

The storage adapter 216 cooperates with the storage operating system 207 executing on the system 200 to access information requested by the server systems 104 and management console 118 (FIG. 1A). The information may be stored on any type of attached array of writable storage device media such as video tape, optical, DVD, magnetic tape, bubble memory, electronic random access memory, flash memory devices, micro-electro mechanical and any other similar media adapted to store information, including data and parity information.

The storage adapter 216 comprises a plurality of ports having input/output (I/O) interface circuitry that couples to storage devices over an I/O interconnect arrangement, such as a conventional high-performance, FC link topology. In another embodiment, instead of using a separate network and storage adapter, a converged adapter is used to process both network and storage traffic.

As an example, storage adapter 216 may be similar to adapter's 114A-114E. The storage adapter 216 ports may be coupled to switch 122 ports as described above in detail. The adapter ports are uniquely identified using WWPN or any other identifier type. The data collection module 150 collects adapter information using discovery requests, as described above in detail.

Figure 3:
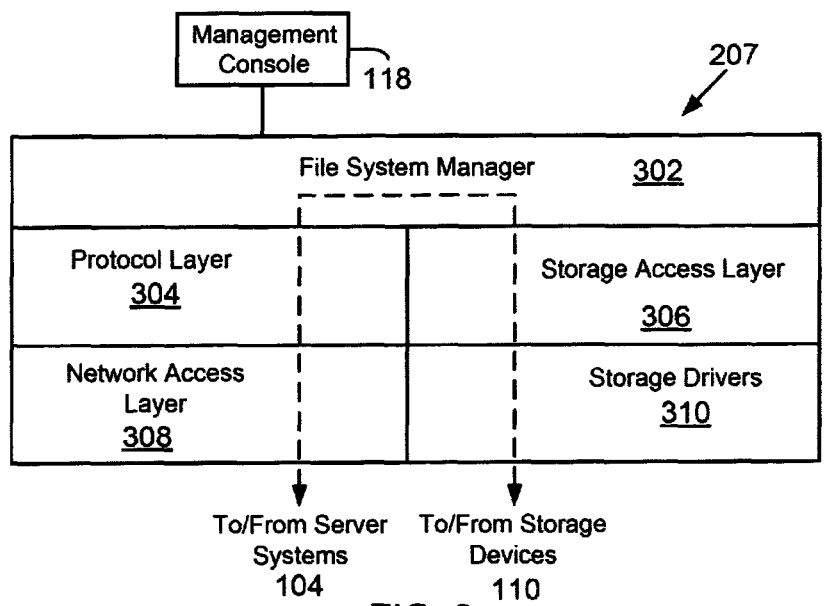
FIG. 3 shows an example of a storage operating system, used according to one embodiment.

Operating System:

FIG. 3 illustrates a generic example of operating system 207 executed by storage system 108, according to one embodiment of the present disclosure. Storage operating system 207 manages storage space that is presented to server systems 104A-104C as LUNs for storing information. The storage operating system 207 maintains the LUN information that is provided to the migration module 152 that is then used to generate the migration plan described above.

As an example, operating system 207 may include several modules, or "layers". These layers include a file system manager 302 that keeps track of a directory structure (hierarchy) of the data stored in storage devices and manages read/write operations, i.e. executes read/write operations on storage devices in response to server system 104 requests.

Operating system 207 may also include a protocol layer 304 and an associated network access layer 308, to allow system 200 to communicate over a network with other systems, such as server system 104, clients 102 and management console 118. Protocol layer 304 may implement one or more of various higher-level network protocols, such as NFS, CIFS, Hypertext Transfer Protocol (HTTP), TCP/IP and others, as described below.

Network access layer 308 may include one or more drivers, which implement one or more lower-level protocols to communicate over the network, such as Ethernet. Interactions between server systems 104 and mass storage devices 110 are illustrated schematically as a path, which illustrates the flow of data through operating system 207.

The operating system 207 may also include a storage access layer 306 and an associated storage driver layer 310 to communicate with a storage device. The storage access layer 306 may implement a higher-level storage protocol, such as RAID, while the storage driver layer 310 may implement a lower-level storage device access protocol, such as FC or SCSI.

It should be noted that the software "path" through the operating system layers described above needed to perform data storage access for a client request may alternatively be implemented in hardware. That is, in an alternate embodiment of the disclosure, the storage access request data path may be implemented as logic circuitry embodied within a field programmable gate array (FPGA) or an ASIC. This type of hardware implementation increases the performance of the file service provided by storage system 108.

As used herein, the term "storage operating system" generally refers to the computer-executable code operable on a computer to perform a storage function that manages data access and may, in the case of system 200, implement data access semantics of a general purpose operating system. The storage operating system can also be implemented as a microkernel, an application program operating over a general-purpose operating system, such as UNIX® or Windows XP®, or as a general-purpose operating system with configurable functionality, which is configured for storage applications as described herein.

In addition, it will be understood to those skilled in the art that the invention described herein may apply to any type of special-purpose (e.g., file server, filer or storage serving appliance) or general-purpose computer, including a standalone computer or portion thereof, embodied as or including a storage system. Moreover, the teachings of this disclosure can be adapted to a variety of storage system architectures including, but not limited to, a network-attached storage environment, a storage area network and a disk assembly directly-attached to a client or host computer. The term "storage system" should therefore be taken broadly to include such arrangements in addition to any subsystems configured to perform a storage function and associated with other equipment or systems.

Figure 4:
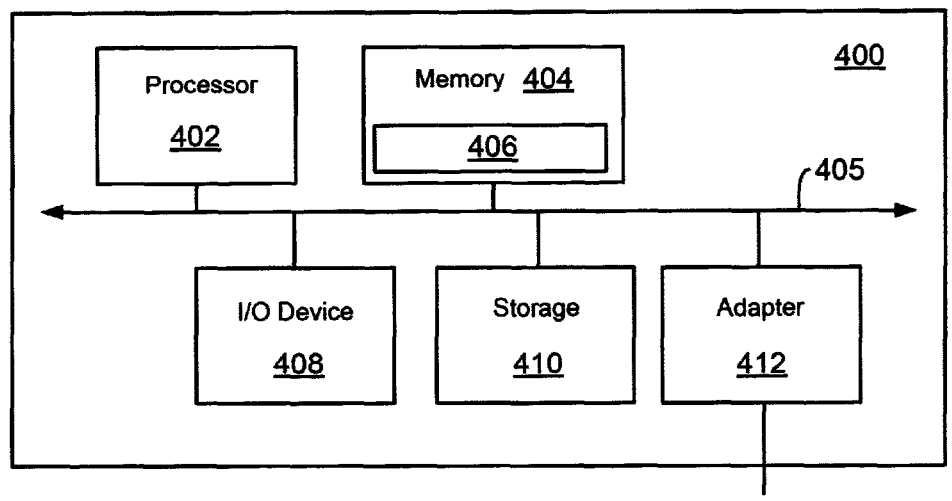
FIG. 4 shows an example of a processing system, used according to one embodiment.

Processing System:

FIG. 4 is a high-level block diagram showing an example of the architecture of a processing system, at a high level, in which executable instructions as described above can be implemented. The processing system 400 can represent modules of management console 118, server systems 104 and others. Processing system 400 may be used to maintain data structures 150A, 153 and 155 described above in detail. Note that certain standard and well-known components which are not germane to the present invention are not shown in FIG. 4.

The processing system 400 includes one or more processors 402 and memory 404, coupled to a bus system 405. The bus system 405 shown in FIG. 4 is an abstraction that represents any one or more separate physical buses and/or point-to-point connections, connected by appropriate bridges, adapters and/or controllers. The bus system 405, therefore, may include, for example, a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire").

The processors 402 are the central processing units (CPUs) of the processing system 400 and, thus, control its overall operation. In certain embodiments, the processors 402 accomplish this by executing programmable instructions stored in memory 404. A processor 402 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

Memory 404 represents any form of random access memory (RAM), read-only memory (ROM), flash memory, or the like, or a combination of such devices. Memory 404 includes the main memory of the processing system 400. Instructions 406 which implements techniques introduced above may reside in and may be executed (by processors 402) from memory 404. For example, instructions 406 may include code for executing the process steps of FIG. 1D.

Also connected to the processors 402 through the bus system 405 are one or more internal mass storage devices 410, and a network adapter 412. Internal mass storage devices 410 may be or may include any conventional medium for storing large volumes of data in a non-volatile manner, such as one or more magnetic or optical based disks. The network adapter 412 provides the processing system 400 with the ability to communicate with remote devices (e.g., storage servers) over a network and may be, for example, an Ethernet adapter, a FC adapter, or the like. The processing system 400 also includes one or more input/output (I/O) devices 408 coupled to the bus system 405. The I/O devices 408 may include, for example, a display device, a keyboard, a mouse, etc.

Cloud Computing:

The system and techniques described above are applicable and useful in the upcoming cloud computing environment. Cloud computing means computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. The term "cloud" is intended to refer to the Internet and cloud computing allows shared resources, for example, software and information to be available, on-demand, like a public utility.

Typical cloud computing providers deliver common business applications online which are accessed from another web service or software like a web browser, while the software and data are stored remotely on servers. The cloud computing architecture uses a layered approach for providing application services. A first layer is an application layer that is executed at client computers. In this example, the application allows a client to access storage via a cloud.

After the application layer, is a cloud platform and cloud infrastructure, followed by a "server" layer that includes hardware and computer software designed for cloud specific services. The management console 118(and associated methods thereof) and storage systems described above can be a part of the server layer for providing storage services. Details regarding these layers are not germane to the inventive embodiments.

Thus, a method and apparatus for generating a migration plan have been described. Note that references throughout this specification to "one embodiment" or "an embodiment" mean that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics being referred to may be combined as suitable in one or more embodiments of the invention, as will be recognized by those of ordinary skill in the art.

While the present disclosure is described above with respect to what is currently considered its preferred embodiments, it is to be understood that the disclosure is not limited to that described above. To the contrary, the disclosure is intended to cover various modifications and equivalent arrangements within the spirit and scope of the appended claims.

What is claimed is:

1. A machine implemented method for generating a migration plan for migrating information from a source storage array to a destination storage array, comprising:

generating a parsed data structure for a processor executable planning module at a management console for generating the migration plan, where the parsed data structure stores information regarding a plurality of components used for migrating the information including a switch, adapters used by a plurality of computing systems to access storage space at the source storage array and a migration appliance that is dedicated for migrating the information from the source storage array to the destination storage array;

wherein the parsed data structure stores switch information identifying the switch and a plurality of switch ports, migration appliance information for identifying the migration appliance and a plurality of migration appliance ports, zoning information for the switch and the migration appliance to prevent unauthorized access to the information after the information is migrated to the destination array, adapter information for each adapter used by the plurality of computing systems, logical unit number (LUN) information for a source LUN at the source storage array with a block size used for storing data at the source LUN and storage operating system information for storage operating systems executed at storage systems managing the source storage array and the destination storage array;

obtaining from the parsed data structure switch information regarding the switch used for migrating the information based on the migration plan;

adding the migration appliance to the migration plan by obtaining migration information from the parsed data structure;

inserting a destination LUN in the migration plan, where the destination LUN is used for storing information at the destination storage array;

configuring the destination LUN such that the destination LUN uses the block size of the source LUN to store the information;

obtaining zoning information regarding the migration appliance from the parsed data structure and using the zoning information in the migration plan for preventing unauthorized access to the information after it is migrated using the migration plan; and generating the migration plan by the planning module identifying the plurality of components for migrating the information from the source storage array.

2. The method of claim 1, wherein the switch information obtained from the parsed data structure identifies each of the plurality of switch ports using a unique world-wide port number.

3. The method of claim 1, further comprising;

collecting data regarding the plurality of components by a processor executed collection module and parsing the collected data for generating the parsed data structure by a processor executable parsing module.

4. The method of claim 1, wherein the planning module is presented within a graphical user interface at the management console.

5. The method of claim 1, wherein the migration information regarding the migration appliance includes a unique identifier for identifying the migration appliance and a unique identifier for identifying each of the plurality of migration appliance ports.

6. The method of claim 1, wherein the migration appliance is coupled to the switch and the plurality of computing systems.

7. The method of claim 1, wherein the planning module maintains a status of the migration plan while it is being generated.

8. A system for generating a migration plan for migrating information from a source storage array to a destination storage array, comprising:

a storage device at the source storage array used by a plurality of computing systems for storing the information; and a management console processor executing instructions out of a memory for a processor executable migration module having a processor executable parsing module and a processor executable planning module for generating the migration plan;

wherein the parsing module is configured to generate a parsed data structure that stores information regarding a plurality of components used for migrating the information including a switch, adapters used by the plurality of computing systems and a migration appliance that is dedicated for migrating the information from the source storage array to the destination storage array; and wherein the parsed data structure stores switch information for the switch and a plurality of switch ports, migration appliance information for the migration appliance and a plurality of migration appliance ports, zoning information for the switch and the migration appliance to prevent unauthorized access to the information after the information is migrated to the destination storage array, adapter information for each adapter used by the plurality of computing systems; logical unit number (LUN) information for a source LUN at the source storage array with a block size used for storing data at the source LUN and storage operating system information for storage operating systems executed at storage systems managing the source storage array and the destination storage array;

and wherein the planning module is configured to add the switch to the migration plan with a unique identifier for identifying each of the plurality of switch ports; add the migration appliance to the migration plan by obtaining migration information from the parsed data structure, where the migration information includes a unique identifier identifying the migration appliance and unique identifier information for identifying the plurality of migration appliance ports; and insert a destination LUN in the migration plan, where the destination LUN is configured to use the source LUN block size to store the information after migration; and generate the migration plan identifying the plurality of components for migrating the information from the source storage array.

9. The system of claim 8, wherein the plurality of switch ports are identified by using unique world-wide port numbers.

10. The system of claim 8, wherein the planning module is presented within a graphical user interface.

11. The system of claim 8, wherein the migration appliance is coupled to the switch and the plurality of computing systems.

12. The system of claim 8, wherein the planning module maintains a status of the migration plan while it is being generated.

13. The system of claim 8, wherein the switch is a Fibre Channel fabric switch.

14. The system of claim 8, wherein the switch is a non-Fibre Channel fabric switch.

15. A non-transitory, machine readable storage medium storing executable instructions, which when executed by a machine, causes the machine to perform a method for generating a migration plan for migrating information from a source storage array to a destination storage array, the method comprising:
  generating a parsed data structure for a processor executable planning module at a management console for generating the migration plan, where the parsed data structure stores information regarding a plurality of components used for migrating the information including a switch, adapters used by a plurality of computing systems to access storage space at the source storage array and a migration appliance that is dedicated for migrating the information from the source storage array to the destination storage array;
  wherein the parsed data structure stores switch information identifying the switch and a plurality of switch ports, migration appliance information for identifying the migration appliance and a plurality of migration appliance ports, zoning information for the switch and the migration appliance to prevent unauthorized access to the information after the information is migrated to the destination array, adapter information for each adapter used by the plurality of computing systems, logical unit number (LUN) information for a source LUN at the source storage array with a block size used for storing data at the source LUN and storage operating system information for storage operating systems executed at storage systems managing the source storage array and the destination storage array;
  obtaining from the parsed data structure switch information regarding the switch used for migrating the information based on the migration plan;
  adding the migration appliance to the migration plan by obtaining migration information from the parsed data structure;
  inserting a destination LUN in the migration plan, where the destination LUN is used for storing information at the destination storage array;
  configuring the destination LUN such that the destination LUN uses the block size of the source LUN to store the information;
  obtaining zoning information regarding the migration appliance from the parsed data structure and using the zoning information in the migration plan for preventing unauthorized access to the information after it is migrated using the migration plan; and
  generating the migration plan by the planning module identifying the plurality of components for migrating the information from the source storage array.

16. The storage medium of claim 15, wherein the switch information obtained from the parsed data structure identifies each of the plurality of switch ports using a unique world-wide port number.

17. The storage medium of claim 15, the method, further comprising;
  collecting data regarding the plurality of components by a processor executed collection module and parsing the collected data for generating the parsed data structure by a processor executable parsing module.

18. The storage medium of claim 15, wherein the migration information regarding the migration appliance includes a unique identifier for identifying the migration appliance and a unique identifier for identifying each of the plurality of migration appliance ports.

19. The storage medium of claim 15, wherein the migration appliance is coupled to the switch and the plurality of computing systems.

20. The storage medium of claim 15, wherein the planning module maintains a status of the migration plan while it is being generated.

* * * * *